No. 612,685. Patented Oct. 18, 1898.
W. N. THORP & F. G. NORMART.
COUPLING FOR BROOM HANDLES.
(Application filed Jan. 7, 1898.)
(No Model.)
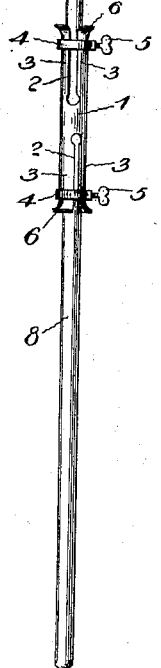
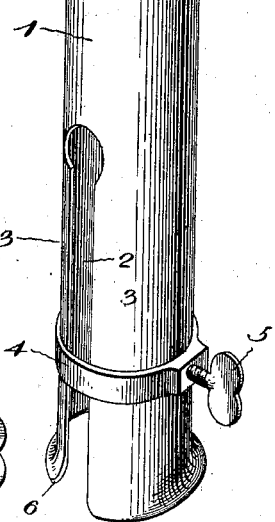
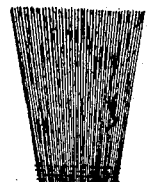
Fig. 1.
Fig. 2.
Fig. 3.
Witnesses
J. Frank Culverwell,
V. B. Hillyard.
William N. Thorp, and
Frank G. Normort
Inventors
By their Attorneys,
C. A. Snow & Co.
THE NORRIS PETERS CO., PHOTO-LITHO., WASHINGTON, D. C.

UNITED STATES PATENT OFFICE.

WILLIAM N. THORP AND FRANK G. NORMART, OF FRESNO, CALIFORNIA.

COUPLING FOR BROOM-HANDLES.

SPECIFICATION forming part of Letters Patent No. 612,685, dated October 18, 1898.

Application filed January 7, 1898. Serial No. 665,953. (No model.)

*To all whom it may concern:*

Be it known that we, WILLIAM N. THORP and FRANK G. NORMART, citizens of the United States, residing at Fresno, in the county of Fresno and State of California, have invented a new and useful Coupling for Broom-Handles and the Like, of which the following is a specification.

This invention relates to that class of devices which provide means for attaching dusters, brooms, or like articles to a pole or staff, whereby places not ordinarily accessible can be reached when cleaning; and it is the purpose of the present invention to provide a coupling which will be light, effective for the purpose designed, and capable of being easily applied, thereby enabling poles or handles of varying diameters to be united, so as to attain the end in view.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a view in elevation, showing the application of the invention. Fig. 2 is a perspective view of the coupling. Fig. 3 is an end view.

Corresponding and like parts are referred to in the following description and indicated in the views of the drawings by the same reference characters.

The coupling comprises a light tube of about seven to eight inches in length, of steel or other metal. This tube 1 has slots 2 extending inward from its ends to within a short distance of a medial point, thereby providing spring clamping-jaws 3, which encircle and grip the parts inserted into the end portions of the coupling. The slots 2 extend longitudinally of the tube and in parallel relation, and their number may vary according to the size of the couping and the purpose for which it is specially designed.

Clamps 4 are slidably fitted upon the end portions of the coupling and serve to contract the jaws 3, whereby they are caused to grip the part thrust therein. These clamps consist of rings or bands and set-screws 5, the latter being fitted into threaded openings formed in a side of the said bands or rings. The clamps can be moved along the tube to any desired point in the length of the jaws 3, thereby enabling the latter to grip the part in the desired manner. The outer ends of the spring clamping-jaws 3 are bent outwardly, as shown at 6, forming stops which engage with and prevent the slipping off of the clamps when the latter are loosened and when the coupling is not in service.

A coupling constructed in the manner set forth enables the parts joined thereby to aline, whereby the pole or extension-handle can be more easily manipulated. As shown in Fig. 1, the handle of the brush 7 is secured to one end of the coupling and the pole or extension-handle 8 is held fast in the opposite end of the coupling, and either can be removed without loosening the other, thereby permitting of a broom or other article being substituted for the brush or a pole 8 of greater or less length being placed in position without requiring the disturbing of the other part, as will be readily comprehended.

Having thus described our invention, what we claim as new, and desire to secure by Letters Patent, is—

A coupling for joining a pole or extension-handle to a brush, broom, or like article, consisting of an integral tube having its end portions longitudinally slotted forming clamping-jaws and having the end portions of the jaws bent outwardly providing stops, and clamps slidably mounted upon the slotted end portions of the tube, said clamps consisting of rings or bands and set-screws mounted in threaded openings thereof and adapted to engage with one of the jaws, substantially as and for the purpose set forth.

In testimony that we claim the foregoing as our own we have hereto affixed our signatures in the presence of two witnesses.

WILLIAM N. THORP.
FRANK G. NORMART.

Witnesses:
JARVIS STREETER, Jr.,
ED. E. BUSH.